Oct. 30, 1951    A. W. TRONNIER    2,573,511
FOUR-LENS PHOTOGRAPHIC OBJECTIVE
Filed Nov. 17, 1949

INVENTOR.
ALBRECHT WILHELM TRONNIER
BY
Mock & Blum
ATTORNEYS.

Patented Oct. 30, 1951

2,573,511

UNITED STATES PATENT OFFICE 2,573,511

FOUR-LENS PHOTOGRAPHIC OBJECTIVE

Albrecht Wilhelm Tronnier, Gottingen, Germany, assignor to Voigtlander & Sohn Aktiengesellschaft, Braunschweig, Germany, a corporation of Germany Application November 17, 1949, Serial No. 127,927
In Switzerland April 30, 1949

1 Claim. (Cl. 88—57)

This invention relates to a new and improved four-lens photographic objective.

One of the objects of the invention is to provide a photographic objective which shall provide minimum chromatic aberration, and which also provides minimum aberrations of other types, including minimum axial and non-axial aberrations, such as minimum spherical aberration, minimum astigmatism and minimum coma.

Another object is to produce a photographic objective which will have such minimum aberrations even whein the lens is operated at high speed by using an entrance pupil of large diameter, and when a field of large angle is photographed. Heretofore, high correction of chromatic aberration could be secured, only by using an entrance pupil of small diameter with resultant increase of exposure time, or by photographing a field of small area or angle.

The improved objective provides the necessary minimum chromatic aberration which is necessary for color photography and in making photographic prints in color, even when using a stop opening or entrance pupil of large diameter and while photographing a field of large angle. As one example, the stop number can exceed f/3.5, in which the "f/number" equals $$\frac{\text{Focal length}}{\text{Diameter of entrance pupil}}$$

Thus, if the equivalent focal length of the lens is 100 millimeters as one example, the diameter of the beam of light which is admitted by the stop aperture of the diaphragm may exceed 28.571 millimeters. Said diameter corresponds to said stop number of "f/3.5" in the "F/system."

Numerous other objects and advantages and features of this invention are set forth in the annexed description and drawings, which include a preferred example of the invention, to which the invention is not limited.

Figure 1:
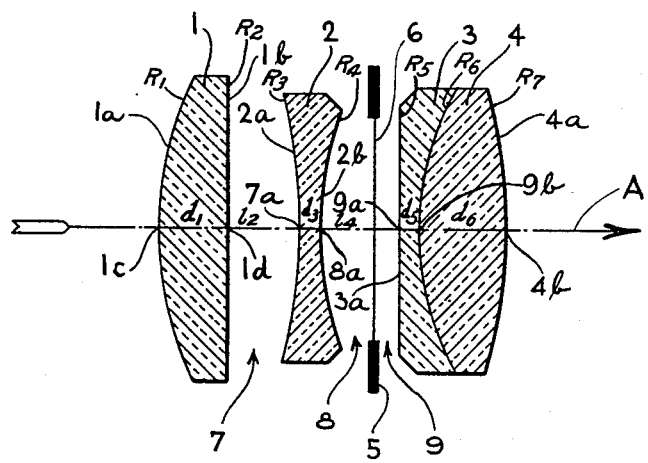

Fig. 1 is a vertical axial section of the improved objective, taken along its optical axis. The horizontal optical axis A is indicated by the horizontal arrow, which also indicates the direction of the light, from left to right. The object space is at the left of the objective, and the image space is at the right of the objective.

Figure 2:
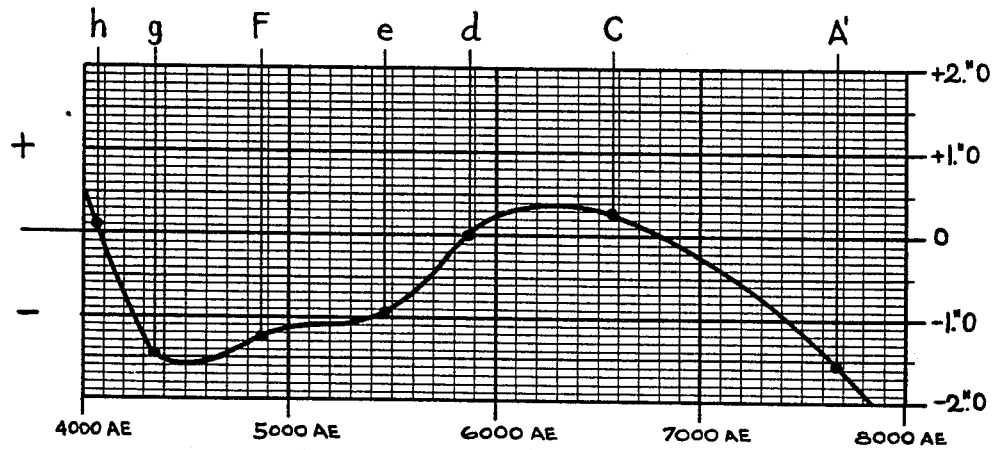

Fig. 2 is a graph which demonstrates the improved correction of chromatic aberration in the new objective, when using a high speed f/3.5 objective. In Fig. 2, the vertical lines represent various wave lengths of light in angstrom units.

The object comprises a front positive convexo-planar lens 1, an intermediate bi-concave negative lens 2, a cemented doublet consisting of a front negative lens 3, and a rear bi-convex positive lens 4.

The diaphragm 5 is located between negative lens 2 and negative lens 3. Said diaphragm 5 has the usual circular stop aperture 6, whose diameter is adjustable.

The lenses 1 and 2 are separated by an air space 7. Lens 2 is separated from diaphragm 5 by an air space 8. Diaphragm 5 is separated from lens 3 by an air space 9.

The lenses 3 and 4 are cemented to each other at their adjacent interfitting faces, in the usual manner, to provide a cemented doublet 3—4.

In the following disclosure, certain symbols are used, which are identified as follows:

$nC$ is the index of refraction of a glass composition, for red light at the Fraunhofer C line, whose wave length is 6563 angstrom units.

$nd$ is the index of refraction for yellow light at the Fraunhofer line of the helium spectrum, whose wave length is 5876 angstrom units.

$nF$ is the index of refraction for blue light at the Fraunhofer F line, whose wave length is 4862 angstrom units.

The Abbe number "v" equals $$\frac{nd-1}{nF-nC}$$

"M. D." identifies the mean dispersion of the respective glass material, as measured by the angle of difference between deviations at the Fraunhofer C and F lines. It is equal to $nF-nC$.

$R_1$ is the radius of curvature of the front surface $1a$ of lens $1$.

$R_2$ is the radius of curvature of the rear surface $1b$ of lens $1$.

$d_1$ is the axial thickness of lens $1$, between the axial points $1c$ and $1d$.

$l_2$ is the axial thickness of air space $7$, between the axial points $1d$ and $7a$.

$R_3$ is the radius of curvature of the front surface $2a$ of lens $2$.

$R_4$ is the radius of curvature of rear surface $2b$ of lens $2$.

$d_3$ is the axial thickness of lens $2$, between the axial points $7a$ and $8a$.

$l_4$ is the total axial thickness of air space $8$—$9$, between the axial points $8a$ and $9a$.

$R_5$ is the radius of curvature of the front surface $3a$ of lens $3$.

$R_6$ is the radius of curvature of the rear surface of lens $3$, and of the front surface of lens $4$.

$d_5$ is the axial thickness of lens $3$, between the axial points $9a$ and $9b$.

$R_7$ is the radius of curvature of the rear face $4a$ of lens 4.

$d_6$ is the axial thickness of lens 4, between the axial points $9b$ and $4b$.

All measurements of length are stated in millimeters.

Fig. 1 illustrates an objective which has an equivalent focal length of 200 millimeters.

Since the design is the same as for an objective which has a unit equivalent focal length of 100 millimeters the specific figures later stated herein are for an objective which has said unit equivalent focal length of 100 millimeters.

In the specific example, the relative aperture is defined by f/3.5. Since the equivalent focal length is 100 millimeters in the example, this corresponds to an entrance pupil whose diameter is 28.571 millimeters.

Following usual practice, the radius of curvature of each curved surface which is convex relative to the object space is given a plus sign, and the radius of curvature of each curved surface which is concave relative to the object space is given a negative sign.

The symbol P designates the back focal length of the objective, which is measured rearwardly along the optical axis A from the point of intersection $4b$ of said optical axis A and the rear surface $4a$ of lens 4. In this example, which is calculated for an equivalent focal length of 100 millimeters, P equals 83.355 millimeters, so that the image plane is located 83.355 millimeters, rearwardly of axial point $4b$. The values of this specific example are as follows:

LENS 1

| $R_1$ | $R_2$ | $d_1$ | v | nd | M. D. |
|---|---|---|---|---|---|
| +33.9730 | infinity | 6.1878 | 60.3 | 1.62166 | 0.01029 |

*Air space 7*

$l_2$ equals 6.9862

LENS 2

| $R_3$ | $R_4$ | $d_2$ | v | nd | M. D. |
|---|---|---|---|---|---|
| −62.6724 | +29.5817 | 2.4951 | 41.7 | 1.57911 | 0.01387 |

*Air spaces 8–9*

$l_4$ equals 7.4852

LENS 3

| $R_4$ | $R_5$ | $d_5$ | v | nd | M. D. |
|---|---|---|---|---|---|
| +1625.595 | +27.3401 | 2.1957 | 41.7 | 1.57911 | 0.01387 |

LENS 4

| $R_6$ | $R_7$ | $d_6$ | nd | M. D. |
|---|---|---|---|---|
| +27.3401 | −46.3666 | 8.18939 | 1.65770 | 0.01295 |

The above example illustrates certain general principles or factors of the invention, which are within its scope. These general principles are stated below, and the invention includes other embodiments which include one or more of said general factors, and the invention also includes said factors in combination and in various subcombinations. The best results are secured by combining all of these factors, but the invention is not limited to such entire combination.

GENERAL FACTORS

The front positive lens 1 has front and rear surfaces $1a$ and $1b$ of unequal curvature. The surface $1a$ of greatest curvature is convex relative to the object space.

The negative intermediate lens 2 has front and rear surfaces $2a$ and $2b$ of unequal curvature. The surface $2b$, whose curvature is greater than the curvature of surface $2a$, is convex relative to the object space.

The rays of light from the object diverge towards the aperture 6 of diaphragm 5 in the air space 7, so that said air space 7 is designated as a negative air lens.

The cemented doublet 3—4 consists of a negative lens 3 and a positive lens 4.

The common surface of this cemented doublet which has the radius of curvature $R_6$, is convex relative to the object space.

Each of the radii of curvature $R_6$ and $R_7$ has an absolute value which is substantially longer than 85% of the diameter of the entrance pupil. Thus, in the specific example which is calculated for an objective whose equivalent focal length is 100 millimeters, the diameter of the entrance pupil for said equivalent focal length of 100 millimeters, is 28.571 millimeters, 85% of which is 24.2853 millimeters. The radius of curvature $R_6$ is 27.3401 millimeters, and the radius of curvature $R_7$ is 46.3666 millimeters.

The absolute value of the length of radius of curvature $R_6$ may be in a range of 24.3 millimeters, to 39.3 millimeters, if the equivalent focal length is 100 millimeters.

The absolute value of the length of radius of curvature $R_7$ may be in a range of 34.3 millimeters to 59.3 millimeters, if the equivalent focal length is 100 millimeters.

The two negative lenses 2 and 3, which are directly adjacent the diaphragm 5, have indices of refraction nd which are substantially less than 1.6000 at said wave length of 5876 angstrom units. This is known per se, but this factor is correlated with other factors to secure the high correction for chromatic aberration, spherical aberration, astigmatism and coma, for a large diameter of entrance pupil and field of large angle. The index of refraction nd of the lenses 2 and 3 may be as low as 1.53 for the aforesaid wave-length. The lens 2 has a shorter focal length and hence has a higher dioptric power than lens 3.

The mean dispersion of each of the negative lenses 2 and 3, namely, $nF-nC$, may be in a range of 0.1175 to 0.01475.

The positive lens 4 of the cemented doublet, which has the shortest focal length and which therefore has the highest dioptric power, has an index of refraction nd for a wave length of 5876 angstrom units, in a range of 1.625 to 1.675.

The mean dispersion of positive lens 4, $nF-nC$, is less than the corresponding mean dispersion of negative lens 2, by a difference which is less than 0.00275. Thus, the mean dispersion of lens 4 is 0.01295, and the mean dispersion of lens 2 is 0.01387. The difference is 0.00092, which is considerably less than 0.00275. This difference may be in a range of 0 to 0.002745.

At said wave length of 5876 angstrom units, the respective indices of refraction nd of the lenses 3 and 4 of the positive doublet are 1.57911 and 1.65770, with an arithmetical mean of 1.618405, which is substantially larger than 1.60. This arithmetical mean may be in a range of 1.601 to 1.649.

Disregarding the plus and minus signs of the end radii of curvature $R_1$ and $R_7$, and taking their respective absolute values 33.9730 and 46.3666, the difference between said absolute values is 12.396, which is in a range of 10% to 20% of the equivalent focal length of 100 millimeters of this example.

Disregarding the plus and minus signs, the sum of the absolute values of the radii of curvature $R_6$ and $R_7$ of the positive lens 4 of the doublet 3—4, is 73.7067, which exceeds the absolute value of the radius $R_3$, which is 62.6724. This sum may be in a range of 101 per cent to 141 per cent of the absolute value of $R_3$, for an equivalent focal length of 100 millimeters.

By correlating these factors, the diameter of the entrance pupil may be increased to more than 28.571% of the equivalent focal length. Thus, the maximum speed of the objective may be increased to considerably above f/4.5. At a speed of f/4.5, the diameter of the entrance pupil is about 22.22% of the equivalent focal length. Since the speed of the objective varies according to the square of the diameter of the entrance pupil, the maximum speed at f/3.5 is substantially 165% of the maximum speed at f/4.5. Hence the exposure time of an f/4.5 stop is substantially 165% of the exposure time of an f/3.5 stop.

The maximum speed can be increased considerably above f/4.5, while maintaining the desired maximum correction for chromatic aberration, by selecting respective glass compositions for the lenses 3 and 4, which have indices of refraction $nd$, whose arithmetical means is greater than 1.6000.

The maximum speed is increased even above f/3.5 while securing precise correction for chromatic aberration, spherical aberration, astigmatism and coma, by selecting the difference between the absolute values of $R_1$ and $R_7$, in a range of 10%–20% of the respective equivalent focal length.

The angle of field can be increased above 40° to more than 50°, so as to secure the field coverage of a universal lens, by making the sum of the absolute values of $R_6$ and $R_7$ greater than $R_3$.

The improvement of the new objective can be illustrated by comparing it with the lateral color correction of a slow process lens f/9, which is normally considered as apochromatic. Such slow lens has an entrance pupil whose diameter is one-ninth of the respective equivalent focal length. Such f/9 stop requires approximately 400% of the exposure time of an f/4.5 stop and almost 670% of the exposure time of an f/3.5 stop.

For purposes of comparison, it is assumed that the principal ray passes through the central point of the diaphragm opening 6 at an angle of 20° to the optical axis A, that said ray enters the objective free from aberrations, and that it leaves the objective with chromatic aberration. Referring to Fig. 2, the range $A'–h$ corresponds to a difference in wave length of 3635 angstrom units. If the comparison lens is the slow anastigmatic f/9 apochromatic lens, the dispersion amounts generally to an arc of 8–12 seconds.

In the improved objective a principal ray which thus passes through the center of the stop opening at an angle of 20° to the optical axis A, will enter the objective at lens 1, at an angle of 15 degrees, 28 minutes, 40.296 seconds. After emerging from the objective at lens 4, said ray will have only the following chromatic angular aberrations:

| Exit Angle | Wave length of principal ray in Angstrom units | Position on Chart of Fig. 2 |
|---|---|---|
| 15° 24' 10.440'' | 7,682 | A' |
| 15° 24' 12.204'' | 6,563 | C |
| 15° 24' 11.952'' | 5,876 | d |
| 15° 24' 11.052'' | 5,461 | e |
| 15° 24' 10.692'' | 4,861 | F |
| 15° 24' 10.512'' | 4,358 | g |
| 15° 24' 12.096'' | 4,047 | h |

The above angular deviations were determined by exact trignometric ray tracing to eight decimal places, which was necessary by reason of the exact progressive correction. The deviation against the ordinary yellow ray whose wave length is 5876 angstrom units is indicated by the graph of Fig. 2 as follows:

| Range | Deviation |
|---|---|
| A'–d | −1.512'' |
| C–d | +0.252'' |
| d | 0 |
| d–e | −0.900'' |
| d–F | −1.260'' |
| d–g | −1.440'' |
| d–h | +0.144'' |

Hence, over this wide spectral range, the maximum chromatic divergence from the slope angle is between −1.512 seconds and +0.252 seconds, and the total divergence over the entire wave length difference of 3635 angstrom units is only 1.764 seconds.

A preferred embodiment of this invention has been described, but numerous changes, omissions, additions and substitutions can be made without departing from its scope.

What is claimed is:

A four-lens objective which comprises a front positive lens, an intermediate negative lens, a cemented positive doublet which consists of a negative lens and a positive lens, and a diaphragm located between said intermediate negative lens and said doublet, said intermediate negative lens being separated by an air space from said front positive lens, said cemented doublet being separated by an air space from said intermediate lens, the negative lens of said doublet being adjacent said diaphragm so that said diaphragm has a negative lens at each side thereof, the index of refraction of each said negative lens being substantially less than 1.60 for yellow light which has a wave length of 5876 angstrom units, the mean dispersion of each said negative lens being substantially in the range of 0.01175 to 0.01475 in the spectral region between the Fraunhofer lines C and F, the front surface of said front lens being convex relative to the object space, the rear surface of the positive lens of said doublet being concave relative to said object space, the radius of curvature of said rear surface of the positive lens of said doublet having a length of greater absolute value than the radius of curvature of said front surface of said front positive lens, and the difference of said absolute values being in a range of substantially 10% to 20% of the equivalent focal length of the objective.

ALBRECHT WILHELM TRONNIER.

(References on following page)

REFERENCES CITED

The following references are of record in the file of this patent:

UNITED STATES PATENTS

| Number | Name | Date |
|---|---|---|
| 1,558,073 | Bielicke | Oct. 20, 1925 |
| 1,741,947 | Merte | Dec. 31, 1929 |
| 1,849,681 | Merte et al. | Mar. 15, 1932 |
| 1,924,527 | Tronnier | Aug. 29, 1933 |
| 2,084,714 | Tronnier | June 22, 1937 |

FOREIGN PATENTS

| Number | Country | Date |
|---|---|---|
| 146,211 | Great Britain | Dec. 30, 1920 |